United States Patent
Hawkins et al.

(10) Patent No.: US 10,150,852 B2
(45) Date of Patent: Dec. 11, 2018

(54) PROCESS FOR PREPARING HYDROPHOBICALLY MODIFIED ALKYLENE OXIDE URETHANE POLYMER

(71) Applicant: Rohm and Haas Company, Philadelphia, PA (US)

(72) Inventors: Douglas R. Hawkins, Maple Glen, PA (US); Stephen D. Thompson, Collegeville, PA (US); Antony K. Van Dyk, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 97 days.

(21) Appl. No.: 15/209,788

(22) Filed: Jul. 14, 2016

(65) Prior Publication Data
US 2017/0015809 A1   Jan. 19, 2017

Related U.S. Application Data

(60) Provisional application No. 62/192,220, filed on Jul. 14, 2015.

(51) Int. Cl.
| | | |
|---|---|---|
| *C08K 5/098* | (2006.01) | |
| *C08K 5/09* | (2006.01) | |
| *C08K 5/092* | (2006.01) | |
| *C08G 18/48* | (2006.01) | |
| *C08G 18/75* | (2006.01) | |
| *C08G 18/10* | (2006.01) | |
| *C08G 18/22* | (2006.01) | |
| *C08K 5/17* | (2006.01) | |

(52) U.S. Cl.
CPC ............. *C08K 5/098* (2013.01); *C08G 18/10* (2013.01); *C08G 18/227* (2013.01); *C08G 18/4833* (2013.01); *C08G 18/758* (2013.01); *C08K 5/09* (2013.01); *C08K 5/092* (2013.01); *C08K 5/175* (2013.01)

(58) Field of Classification Search
CPC .......... C08K 5/098; C08K 5/09; C08K 5/092; C08K 5/175; C08G 18/10; C08G 18/227; C08G 18/4833; C08G 18/758; C08G 18/2825; C08L 75/08
USPC ....................................................... 524/238
See application file for complete search history.

(56) References Cited

U.S. PATENT DOCUMENTS

| | | |
|---|---|---|
| 4,155,892 A | 5/1979 | Emmons et al. |
| 5,554,700 A | 9/1996 | Schipfer et al. |
| 7,741,402 B2 | 6/2010 | Bobsein et al. |
| 2009/0318595 A1 | 12/2009 | Steinmetz et al. |
| 2013/0158194 A1 | 6/2013 | Bobsein et al. |

FOREIGN PATENT DOCUMENTS

| | | |
|---|---|---|
| AU | 33009/71 | 3/1973 |
| WO | 2013070370 A1 | 5/2013 |

OTHER PUBLICATIONS

Xiao et al., Paint and Coating Testing Manual—Fifteenth Edition of the Gardner-Sward Handbook: (MNL 17-2nd), ASTM International, (2012) [retrieved on Dec. 9, 2017]. Retrieved from the Internet: <URL: http://app.knovel.com/hotlink/toc/id:kpPCTMFEG1/paint-coating-testing/paint-coating-testing> Chapter 13, pp.*

* cited by examiner

*Primary Examiner* — Josephine L Chang
(74) *Attorney, Agent, or Firm* — Reid S. Willis

(57) ABSTRACT

The present invention relates to a composition comprising an aqueous solution of a hydrophobically modified alkylene oxide urethane polymer (HEUR), a bismuth salt, and at least one sediment abating compound selected from the group consisting of citric acid or a salt thereof, gluconic acid or a salt thereof, and a salt of ethylenediamine tetraacetic acid. The composition with the specific sediment abating compounds shows excellent abatement in sediment and color formation in heat age testing of the solution.

8 Claims, No Drawings

PROCESS FOR PREPARING HYDROPHOBICALLY MODIFIED ALKYLENE OXIDE URETHANE POLYMER

BACKGROUND OF THE INVENTION

The present invention relates to a process for preparing a hydrophobically modified alkylene oxide urethane polymer, particularly one that is prepared with bismuth catalyst.

Hydrophobically modified ethylene oxide urethane polymers (HEURs) are rheology modifiers commonly used to thicken coatings formulations. HEURs are typically prepared by reacting together a polyethylene glycol, a polyisocyanate, and a capping agent in the presence of an oganotin catalyst; despite the low concentrations of tin catalyst used to prepare the polymer, environmental pressures are motivating the industry to replace organotin catalysts with more environmentally acceptable catalysts such as salts of bismuth. While environmentally friendly, such catalysts are known to cause undesirably high amounts of precipitation or sedimentation in the final product, as well as undesirable color. Accordingly, it would be desirable to find an environmentally acceptable way to prepare HEURs without substantial formation of precipitation or sedimentation or color during heat aging.

SUMMARY OF THE INVENTION

The present invention addresses a need in the art by providing, in a first aspect, a method comprising the steps of contacting a hydrophobically modified alkylene oxide urethane polymer with water and at least one sediment abating compound, which is citric acid or a salt thereof, gluconic acid or a salt thereof, or a salt of ethylenediamine tetraacetic acid, to form a solution, wherein the hydrophobically modified alkylene oxide urethane polymer comprises from 5 to 1000 ppm of a bismuth salt, wherein the concentration of the sediment abating compound is from 0.05 to 4 weight percent, based on the weight of the solution, and the concentration of the hydrophobically modified alkylene oxide urethane polymer is from 12 to 50 weight percent, based on the weight of the solution.

In another aspect, the present invention is a composition comprising an aqueous solution of a hydrophobically modified alkylene oxide urethane polymer, a bismuth salt, and at least one sediment abating compound, which is citric acid or a salt thereof, gluconic acid or a salt thereof, or a salt of ethylenediamine tetraacetic acid (EDTA salt), wherein the concentration of the hydrophobically modified alkylene oxide urethane polymer is from 12 to 50 weight percent, the concentration of the bismuth salt is from 5 to 1000 ppm, and the concentration of the sediment abating compound is from 0.05 to 4 weight percent, all based on the weight of the solution.

DETAILED DESCRIPTION OF THE INVENTION

In a first aspect, the present invention is a method comprising the steps of contacting a hydrophobically modified alkylene oxide urethane polymer with water and at least one sediment abating compound, which is citric acid or a salt thereof, gluconic acid or a salt thereof, or a salt of ethylenediamine tetraacetic acid, to form a solution, wherein the hydrophobically modified alkylene oxide urethane polymer comprises from 5 to 1000 ppm of a bismuth salt, wherein the concentration of the sediment abating compound is from 0.05 to 4 weight percent, based on the weight of the solution, and the concentration of the hydrophobically modified alkylene oxide urethane polymer is from 12 to 50 weight percent, based on the weight of the solution.

As used herein, "hydrophobically modified alkylene oxide urethane polymer" refers to a hydrophobically modified ethylene oxide urethane polymer (HEUR), a hydrophobically modified propylene oxide urethane polymer, a hydrophobically modified ethylene oxide/propylene oxide urethane copolymer, a hydrophobically modified ethylene oxide/butylene oxide urethane copolymer, or a hydrophobically modified ethylene oxide/propylene oxide/butylene oxide urethane terpolymer. Preferably, the hydrophobically modified alkylene oxide urethane polymer is a hydrophobically modified ethylene oxide urethane polymer (HEUR). Hydrophobically modified alkylene oxide urethane polymers can be prepared in a variety of ways, such as those methods disclosed in US 2009/0318595 A1, U.S. Pat. Nos. 4,155,892, 7,741,402, and US Pat. Pub. 2013/0158194.

The hydrophobically modified alkylene oxide urethane polymer used in the process of the present invention is prepared in the presence of a bismuth salt such as bismuth acetate, bismuth 2-ethylhexanoate, bismuth n-hexanoate, bismuth n-octanoate, bismuth neodecanoaate, and bismuth naphthenate. The bismuth-containing hydrophobically modified alkylene oxide urethane polymer is combined with the sediment abating compound and water and optionally other additives to form the solution of the bismuth-containing hydrophobically modified alkylene oxide urethane polymer. The concentration of the sediment abating compound is preferably from 0.1, more preferably from 0.2 weight percent, to preferably 3, more preferably to 2, and most preferably to 1 weight percent based on the weight of the solution. The concentration of hydrophobically modified alkylene oxide urethane polymer is preferably from 15, to preferably 40, and more preferably 25 weight percent, based on the weight of the solution; and the concentration of the bismuth salt is preferably from 10, and more preferably from 20 ppm, to preferably 500, more preferably to 200, and most preferably to 100 ppm, based on the weight of the solution. For solutions containing citric and gluconic acids or salts thereof or combinations thereof, the pH is preferably in the range of 2.5 to 6, more preferably to 5. For the solution containing the EDTA salt the pH is preferably in the range of from 7.5, more preferably from 8, to 11, more preferably to 10. The solution may also contain other additives such as oligosaccharides—for example, cyclodextrin—to reduce solution viscosity, as well as biocides and pH modifiers.

It has been surprisingly discovered that the only compounds that showed acceptably low sediment and color formation in heat age testing were citric acid, gluconic acid, and a salt of ethylenediamine tetraacetic acid. Citric acid proved to be exceptionally effective in abating sediment and color.

EXAMPLES

Intermediate Example 1

Preparation of a Bi-Catalyzed HEUR

A mixture of CARBOWAX™ Polyethylene Glycol 8000 (200.0 g, A Trademark of The Dow Chemical Company or its Affiliates) and toluene (325.0 g) was dried by azeotropic distillation, then cooled to 90° C. in a reaction vessel under $N_2$. 4,4'-methylene bis(cyclohexyl isocyanate) (8.8 g) and bismuth 2-ethylhexanoate (28% Bi, 0.2 g) were added to the vessel with stirring for 1 h, after which time n-decanol (3.4 g) was added. Stirring was continued at 90° C. for an additional hour, whereupon the resulting solid polymer was isolated after toluene evaporation. $M_w$ was 40,000 Daltons by size exclusion chromatography (SEC) using polyethylene oxide standards.

Screening of Candidates

A series of experiments was performed to find suitable candidates (acids, for the most part) for sediment and color abatement. Solutions were prepared using bismuth 2-ethylhexanoate (700 ppm) in water/butyl carbitol (50:50 w/w) in combination with various acids at pH's in the range of 2.1 to 6.5. A mixture of butyl carbitol and water (18 g) was placed in glass vials, followed by addition of the acid, the oligosaccharide, and the buffer additives to target pH. The vials were shaken and bismuth 2-ethylhexanoate was then added. The pH was measured and sediment and color were measured at 60° C. after 3 d heat aging. Table 1 summarizes the sediment and color formation for the materials tested. A rating of 0 to 3 was used for sediment and color: A rating of 0 or 1 for each is considered acceptable.

For sediment,

0=no evidence of sediment formation;

1=trace amounts of sediment formation;

2=more than trace but <1 mm sediment formation at the bottom of the vial; and

3=>1 mm sediment formation.

For color,

0=no evidence of color;

1=a trace of color (usually red or brown);

2=distinct red or brown color;

3=intensely colored.

TABLE 1

Sediment and Color Screening Results

| Additive | % | pH | sediment | color |
|---|---|---|---|---|
| citric acid | 0.5 | 4.6 | 0 | 1 |
| gluconic acid | 0.5 | 4.7 | 1 | 1 |
| Na EDTA | 0.5 | 3.9 | 1 | 1 |
| ascorbic acid | 0.5 | 5.5 | 3 | 2 |
| lactic acid | 0.5 | 6.5 | 2 | 2 |
| trifluoromethane sulfonic acid | 0.5 | 2.1 | 3 | 2 |
| succinic acid | 0.5 | 5.0 | 3 | 2 |
| malic acid | 0.5 | 4.1 | 3 | 1 |
| aspartic acid | 0.5 | 4.3 | 3 | 1 |
| fumaric acid | 0.5 | 4.5 | 3 | 2 |
| tartaric acid | 0.5 | 3.2 | 3 | 2 |
| control (no added acid) | 0 | 7.3 | 3 | 1 |

The screening showed that only 3 candidates were suitable for sediment and color abatement: Citric acid, Gluconic acid, and EDTA. Aqueous solutions of the Bi-catalyzed Intermediate 1 HEUR and each of these materials were prepared as described in the next section.

Example 1

Preparation of a Solution of a Bi-Catalyzed HEUR with Citric Acid at Low pH

Biocide (14 ppm), citric acid (0.25 g), oligosaccharides (4.2 g, 50% active), and Intermediate Example 1 (8.75 g) were dissolved in water (36.3 g) overnight at room temperature. The pH of the solution was adjusted to 4.1 with NaOH.

Example 2

Preparation of a Solution of a Bi-Catalyzed HEUR with Gluconic Acid at Low pH

This example was prepared substantially as described in Example 1 except that gluconic acid (0.5 g, 50% aqueous) was used instead of citric acid. The pH was 2.9.

Example 3

Preparation of a Solution of a Bi-Catalyzed HEUR with EDTA at High pH

This example was prepared substantially as described in Example 1 except that EDTA (0.0.25 g) was used instead of citric acid. The pH of the solution was adjusted to 9.3 with 10% NaOH.

Comparative Example 1

Preparation of a Solution of a Bi-Catalyzed HEUR without Sediment Abating Compound This example was prepared substantially as described in Example 1 except that no sediment abating compound was added. The pH of the sample was 7.2.

Comparative Example 2

Preparation of a Solution of a Bi-Catalyzed HEUR with EDTA at High pH

This example was prepared substantially as described in Example 3 except that the pH of the solution was 3.9.

Examples 1-3 and Comparative Examples 1 and 2 were evaluated for sediment and color after heat aging at 60° C. for 3 d. The effect of the sediment abating compound (SAC) on sediment formation and color is shown in Table 1.

TABLE 1

Effect of Sediment and Color Formation of HEURs and Additives

| Example | SAC | % | pH | sediment | color |
|---|---|---|---|---|---|
| Ex. 1 | citric acid | 0.5 | 4.1 | 0 | 0 |
| Ex. 2 | gluconic acid | 0.5 | 2.9 | 1 | 0 |
| Ex. 3 | Na EDTA | 0.5 | 9.3 | 0 | 1 |
| Comp. Ex 1 | Control | 0 | 7.2 | 2 | 2 |
| Comp. Ex 2 | EDTA | 0.5 | 3.9 | 2 | 1 |

Table 1 shows that the Bi-catalyzed HEUR containing citric acid, gluconic acid, or the sodium salt of EDTA all passed the sediment and color tests. Although EDTA was found to be acceptable in the initial screening tests at pH 3.9 in water and butyl carbitol, it was found to show higher sediment formation in unadulterated water, presumably due to its low water solubility. At a pH of 9.3, however, excellent results were obtained for Na EDTA.

The invention claimed is:

1. A color formation abatement and sediment abatement method comprising the steps of contacting a hydrophobically modified alkylene oxide urethane polymer with water and at least one sediment abating compound, which is citric acid or a salt thereof, gluconic acid or a salt thereof, or a salt of ethylenediamine tetraacetic acid, to form a solution, wherein the hydrophobically modified alkylene oxide urethane polymer comprises from 5 to 1000 ppm of a bismuth salt, wherein the concentration of the sediment abating compound is from 0.05 to 4 weight percent, based on the weight of the solution, and the concentration of the hydrophobically modified alkylene oxide urethane polymer is from 12 to 50 weight percent, based on the weight of the solution.

2. The method of claim 1 wherein the concentration of the hydrophobically modified alkylene oxide urethane polymer is from 15 to 40 weight percent, based on the weight of the solution; and the concentration of the bismuth salt is from 10 to 200 ppm, based on the weight of the solution.

3. The method of claim 2 wherein the concentration of the sediment abating compound is from 0.1 to 3 weight percent, based on the weight of the solution, the pH of the solution is in the range of 2.5 to 6, and the sediment abating compound is citric acid or a salt thereof or a combination thereof.

4. The method of claim 3, wherein the concentration of the citric acid is in the range of from 0.1 to 1 weight percent, based on the weight of the solution; and wherein the hydrophobically modified alkylene oxide urethane polymer comprises from 10 to 100 ppm of the bismuth salt.

5. A composition comprising an aqueous solution of a hydrophobically modified alkylene oxide urethane polymer, a bismuth salt, and at least one sediment abating compound which is citric acid or a salt thereof, gluconic acid or a salt thereof, or a salt of ethylenediamine tetraacetic acid, wherein the concentration of the hydrophobically modified alkylene oxide urethane polymer is from 12 to 50 weight percent, the concentration of the bismuth salt is from 5 to 1000 ppm, and the concentration of the sediment abating compound is from 0.05 to 4 weight percent, all based on the weight of the solution, wherein the aqueous solution has abated sediment and abated color formation.

6. The composition of claim 5 wherein the concentration of the hydrophobically modified alkylene oxide urethane polymer is from 15 to 40 weight percent, based on the weight of the solution; and the concentration of the bismuth salt is from 10 to 200 ppm, based on the weight of the solution.

7. The composition of claim 6 wherein the concentration of the sediment abating compound is from 0.1 to 3 weight percent, based on the weight of the solution, the pH of the solution is in the range of 2.5 to 6, and the sediment abating compound is citric acid or a salt thereof or a combination thereof.

8. The composition of claim 7, wherein the concentration of the citric acid is in the range of from 0.1 to 1 weight percent, based on the weight of the solution; and wherein the concentration of the bismuth salt is in the range of 10 to 100 ppm.

* * * * *